Patented Dec. 16, 1952

2,622,100

UNITED STATES PATENT OFFICE 2,622,100

SECONDARY OCTYL ETHER OF TRI-IODO PHENOL AS AN X-RAY CONTRAST MEDIA

George Newbery, deceased, late of Hutton Mount, England, by Lily Newbery, Hutton Mount, and George Richard Newbery, Harrow, England, executors, and Dennis David Libman, London, England, assignors to May & Baker Limited, Dagenham, England, a British company No Drawing. Application January 12, 1948, Serial No. 1,897. In Great Britain March 29, 1946

Section 1, Public Law 690, August 8, 1946
Patent expires March 29, 1966

1 Claim. (Cl. 260—612)

This invention is for improvements in or relating to X-ray contrast media and to the production of X-ray photographs therewith.

In the examination of various internal organs of the living body which cannot be studied by normal visual means or are accessible for that purpose only by operative methods, it is known to effect a temporary, artificial increase in opacity to X-rays of the organ to be studied by the introduction into a suitable body cavity of a substance containing an element of high atomic weight and then to take a radiograph of the part of the body concerned, when the organ under examination is sharply delineated in contrast to the adjacent body material.

The substances in question, which are known as X-ray contrast media, must not only possess a sufficient opacity to X-rays but also must be stable and non-injurious to the body while present therein. Organic compounds containing iodine, especially iodinated vegetable oils and particularly iodinated poppy seed oil, have been widely used in radiological examinations for examination in bronchiography, myelography, hystero-salpingography, cystography, and in the examination of ducts and sinuses, as well in a number of other applications. These iodine compounds, however, possess certain disadvantages; in clinical use, for example, cases of toxicity and of irritation to tissue have been reported.

It is an object of the present invention to provide new X-ray contrast media exhibiting advantage over organic iodine compounds hitherto employed and in particular over iodised poppy seed oil for the purposes for which the latter has hitherto been used. A further object of this invention is to provide processes for the preparation of new compounds suitable for use as X-ray contrast media.

In accordance with one feature of this invention, a process of making a radiograph of various internal organs of the living body comprises the introduction into the desired body cavity by the usual methods of an ether of the formula:

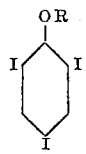

(where R represents a secondary alkyl group containing not less than 4 and not more than 8 carbon atoms) followed by exposure to X-rays of the part of the body concerned and the production of an X-ray photograph in manner known per se.

In accordance with a further feature of this invention, the new X-ray contrast media are prepared by known methods for the production of ethers of the aromatic series from a corresponding alcohol and especially by the Williamson synthesis as illustrated in the following examples. By the expression "known methods" is meant any method heretofore practised or described in the literature on the subject.

The new X-ray contrast media may be used as such since they are liquid at body temperature, but they may be employed, if desired, in the form of solutions in a suitable vehicle (for example a suitable bland oil such as poppy seed oil) or in the form of aqueous dispersions incorporating, if desired, suitable dispersing and/or stabilising agents. Furthermore, the ethers of the invention may be employed in admixture.

The present invention is illustrated by the following examples:

Example I 23 g. of metallic sodium were dissolved in 900 g. of ethyl alcohol and 472 g. of 2:4:6-tri-iodo phenol where then added. When dissolution was complete, 193 g. of sec.-octyl bromide and 900 g. of ethyl alcohol were added and the reaction mixture refluxed for 1½–2½ hours. Thereupon the reaction mixture was diluted with several times its bulk of water, and the heavy oil thus separated was collected. After being dried with anhydrous magnesium sulphate, the oil was distilled under reduced pressure, a fraction boiling at 169° to 173° C. under 0.1 mm. Hg pressure being collected. This fraction was further purified and a colourless oil boiling at 171° C. under 0.1 mm. Hg pressure obtained. It was the sec.-octyl ether of 2:4:6-tri-iodophenol.

In use as an X-ray contrast agent this product has shown substantial advantage over viscous iodised poppy seed oil in, for example, bronchiography.

Example II

Following the preparative procedure of Example I but using sec.-butyl bromide in place of sec.-octyl bromide there was obtained the sec.-butyl ether of 2:4:6-tri-iodophenol, a highly viscous oil boiling at 140° C. under 0.1 mm. Hg pressure.

This product like that of Example I, has been used with advantage in substitution for poppy seed oil in bronchiography.

The present invention is no, of course, limited to the compounds of the foregoing examples, but also includes: sec.-amyl ether of 2:4:6-tri-iodophenol, a viscous oil boiling at 165° C. under 0.2 mm. Hg pressure; sec.-heptyl ether of 2:4:6-tri-iodophenol, boiling at 175° C. under 0.2 mm. Hg pressure and sec.-heptyl ether of 2:4:6-tri-iodophenol, boiling at 158° C. under 0.1 mm. Hg pressure.

The new X-ray contrast media differ both from homologues and from analogous ethers derived from primary saturated and unsaturated aliphatic alcohols in that they are stable, non toxic and viscous liquids and, having these necessary qualities, exhibit by reason of their constant composition and higher iodine content decided advantage over iodised poppy seed oil.

We claim:

An X-ray contrast medium in the form of a stable, viscous liquid consisting of the secondary octyl ether of 2:4:6-tri-iodophenol.

LILY NEWBERY.
GEORGE RICHARD NEWBERY.
*Executors of the estate of George Newbery, deceased.*
DENNIS DAVID LIBMAN.

REFERENCES CITED

The following references are of record in the file of this patent:

UNITED STATES PATENTS

| Number | Name | Date |
|---|---|---|
| 2,098,094 | Hiemenz | Nov. 2, 1937 |
| 2,135,474 | Sachs | Nov. 1, 1938 |
| 2,186,367 | Coleman | Jan. 9, 1940 |
| 2,247,880 | Guerbet | July 1, 1941 |
| 2,348,231 | Strain | May 9, 1944 |

OTHER REFERENCES

Brenans: "Comptes Rendus," vol. 133 (1901) p. 160–62.

Drew et al.: "Jour. Am. Chem. Soc." vol. 61 (1939) p. 2666.